United States Patent
Zverkov et al.

(10) Patent No.: US 12,238,138 B2
(45) Date of Patent: Feb. 25, 2025

(54) METHOD AND DEVICE FOR CLUSTERING PHISHING WEB RESOURCES BASED ON VISUAL CONTENT IMAGE

(71) Applicant: F.A.C.C.T. ANTIFRAUD LLC, Moscow (RU)

(72) Inventors: Boris Zverkov, Tula (RU); Nikolay Prudkovskiy, Moscow (RU)

(73) Assignee: F.A.C.C.T. ANTIFRAUD LLC, Moscow (RU)

( * ) Notice: Subject to any disclaimer, the term of this patent is extended or adjusted under 35 U.S.C. 154(b) by 385 days.

(21) Appl. No.: 17/861,323

(22) Filed: Jul. 11, 2022

(65) Prior Publication Data

US 2022/0385694 A1    Dec. 1, 2022

Related U.S. Application Data

(63) Continuation-in-part of application No. 17/749,368, filed on May 20, 2022.

(30) Foreign Application Priority Data

May 20, 2021    (RU) ............................ RU2021114210

(51) Int. Cl.
*H04L 9/40*    (2022.01)
*G06V 10/44*   (2022.01)
(Continued)

(52) U.S. Cl.
CPC .......... *H04L 63/1483* (2013.01); *G06V 10/44* (2022.01); *G06V 10/751* (2022.01);
(Continued)

(58) Field of Classification Search
CPC .. H04L 63/1483; G06V 10/44; G06V 10/751; G06V 10/761; G06V 10/763; G06V 10/7635; G06V 2201/09
See application file for complete search history.

(56) References Cited

U.S. PATENT DOCUMENTS 5,949,913 A * 9/1999 Shimazu ................. G06T 7/136
                                                  382/302
6,778,703 B1 * 8/2004 Zlotnick ............... G06V 30/412
                                                  382/218
(Continued)

FOREIGN PATENT DOCUMENTS

CN      101826105 B    6/2013
RU      2637477 C1    12/2017
RU      2676247 C1    12/2018

OTHER PUBLICATIONS

Search Report with regard to the counterpart NL Patent Application No. 2031940 completed Feb. 23, 2023.
(Continued)

*Primary Examiner* — Amandeep Saini
*Assistant Examiner* — Andrew S Budisalich
(74) *Attorney, Agent, or Firm* — BCF LLP

(57) ABSTRACT

A method and a computing device for clustering phishing web resources based on images of visual content thereof are provided. The method comprises: receiving references to a plurality of phishing web resources; generating, for a given phishing web resource of the plurality of phishing web resources, at least one image of a visual content of the given phishing web resource; analyzing the at least one image associated with the given phishing web resource, the analyzing comprising identifying contours of elements of the visual content of the given phishing web resource within the at least one image; conducting pairwise comparison between the contours associated with the given phishing web resource and contours of stored clusters of visual content images; and storing, in a database, data indicative of an association between the given phishing web resource and a respective cluster of the at least one image.

16 Claims, 7 Drawing Sheets

(51) Int. Cl.
*G06V 10/74* (2022.01)
*G06V 10/75* (2022.01)
*G06V 10/762* (2022.01)

(52) U.S. Cl.
CPC .......... *G06V 10/761* (2022.01); *G06V 10/763* (2022.01); *G06V 10/7635* (2022.01); *G06V 2201/09* (2022.01)

(56) References Cited

U.S. PATENT DOCUMENTS

| 8,381,292 | B1 | 2/2013 | Warner et al. |
| 8,856,937 | B1 | 10/2014 | Wüest et al. |
| 10,200,381 | B2 | 2/2019 | Hunt et al. |
| 11,601,460 | B1 * | 3/2023 | Hunt ...................... G06F 40/14 |
| 2007/0078846 | A1 | 4/2007 | Iwanaga et al. |
| 2010/0095375 | A1 | 4/2010 | Krishnamurthy et al. |
| 2010/0131499 | A1 * | 5/2010 | van Leuken ......... G06V 10/763 |
| | | | 707/723 |
| 2010/0186088 | A1 | 7/2010 | Banerjee et al. |
| 2014/0294316 | A1 * | 10/2014 | Allamsetty ............... G06T 7/13 |
| | | | 382/260 |
| 2014/0359760 | A1 | 12/2014 | Gupta et al. |
| 2015/0067839 | A1 | 3/2015 | Gulli et al. |
| 2018/0115584 | A1 * | 4/2018 | Alhumaisan ........ H04L 63/1483 |
| 2018/0349722 | A1 * | 12/2018 | Chiang ..................... G06T 7/11 |
| 2019/0089910 | A1 * | 3/2019 | Banik ....................... G06T 5/77 |
| 2019/0222609 | A1 * | 7/2019 | Slipenchuk ......... H04L 63/1416 |
| 2020/0036751 | A1 | 1/2020 | Kohavi |
| 2021/0312651 | A1 * | 10/2021 | Wang ....................... G06T 7/62 |
| 2022/0036614 | A1 * | 2/2022 | Lim ....................... G06T 11/60 |

OTHER PUBLICATIONS

Zhao et al., "A Review of Computer Vision Methods in Network Security", arxiv.org, Cornell University Library, 2020, pp. 1-37.

\* cited by examiner

METHOD AND DEVICE FOR CLUSTERING PHISHING WEB RESOURCES BASED ON VISUAL CONTENT IMAGE

CROSS-REFERENCE

The present application is a Continuation-in-Part of a U.S. patent application Ser. No. 17/749,368, filed on May 20, 2022, entitled "METHOD AND DEVICE FOR CLUSTERING PHISHING WEB RESOURCES BASED ON VISUAL CONTENT IMAGE", which claims convention priority to Russian Patent Application No. 2021114210, filed May 20, 2021, entitled "METHOD AND SYSTEM FOR DYNAMIC INDEXATION AND LOADING OF MODULE CODES", the entirety of all of which is incorporated herein.

FIELD

The present technology relates broadly to the field of cybersecurity, and in particular, to systems and methods for clustering phishing web resources based on visual content thereof.

BACKGROUND

Phishing sites are one of the most widespread types of malicious web resources. Their main purpose is obtaining confidential user data to commit fraudulent acts. The principle of phishing sites operation is copying or imitation of web resources of various brands, for example, those of banks, payment systems, e-mail, social networks or trademarks, and the like, to obtain confidential data from a user (login, password, e-mail, name, ID document number, payment card details, etc.).

For example, but not limited to, in a given phishing remote banking site, the user can be requested to enter their login data and/or provide additional confidential information. After that, the obtained information is used by phishers for stealing user funds or executing other illegal actions, as an example.

In another example, imitation of legitimate web resources could also be carried out with the purpose of advertising, displaying untrustworthy or banned information, as well as in case of an official resource mirror — for illegal distribution of copyrighted or banned content. All described actions may damage business reputation of the owners of the legitimate web resources or provide illegal access to sensitive content.

Phishing distribution techniques allow creating similar looking, web sites using so-called phishing kits, which complicates their timely detection and blocking.

Broadly speaking, a phishing kit is an archive file comprising scripts required for creation and operation of a phishing site. Such a tool allows phishers without deep programming skills to deploy hundreds of phishing pages relatively quickly, often using them as "mirrors" of each other. When such site is blocked, the phisher activates another one, when that one is blocked, they activate yet other one, and so on. Thus, a phishing kit allows attackers to restore operation of malicious resources quickly, ensuring their own invulnerability. This explains the interest in them among cyber security experts. Detecting phishing kits allows not only identifying hundreds or even thousands of phishing pages, but what is more important, it could serve as a starting point for investigations in order to identify their developers and bring them to justice.

It is worth noting that in order to attract buyers, the developers of phishing kits use well-known brands with a large audience, which may make it easier for future owners of such kits to implement fraudulent schemes. In 2020, the brands most frequently used in phishing kits were Amazon, Google, Instagram, Office 365, and PayPal, while Exploit, OGUsers and Crimenetwork were in top 3 online phishing kits markets.

Certain prior art approaches have been proposed to tackle the technical problem of identifying such phishing web resources.

U.S. Pat. No. 8,856,937-B1 issued on Oct. 7, 2014, assigned to NortonLifeLock Inc, and entitled "METHODS AND SYSTEMS FOR IDENTIFYING FRAUDULENT WEBSITES" discloses a method for identifying fraudulent websites. The method may include identifying a fraudulent-website toolkit. The fraudulent-website toolkit may be programmed for use in creating a fraudulent website. The method may also include determining a characteristic of the fraudulent-website toolkit and using the characteristic of the fraudulent-website toolkit to identify a website created using the fraudulent-website toolkit. The website created using the fraudulent-website toolkit may be identified by searching for websites that comprise the characteristic of the fraudulent-website toolkit. The website created using the fraudulent-website toolkit may also be identified by determining that a web browser is attempting to access the website.

Chinese Patent No. 101,826,105-B issued on Jun. 5, 2013, assigned to Nanjing University of Posts and Telecommunication, and entitled "PHISHING WEBPAGE DETECTION METHOD BASED ON HUNGARY MATCHING ALGORITHM" discloses a phishing webpage detection method based on Hungary matching algorithm that is characterized by firstly extracting the text feature signatures, image feature signatures and general webpage feature signatures of the rendered webpages and more comprehensively depicting the features after access to webpages; and then computing the optimal matching of bipartite graphs by Hungary algorithm to search for the matched feature pairs among different webpage signatures and more objectively measuring the similarity among the webpages on the basis, thereby improving the phishing webpage detection efficiency. The method is also characterized by determining the inside weights of the text features, image features and global image features by utilizing the area under curve and determining the relative weights among the text similarity, image similarity and global image similarity during webpage similarity computation by utilizing logarithmic regression analysis. The precision and the recall rate are greatly improved in the method provided by the invention U.S. Pat. No. 10,200,381-B2, issued on Feb. 5, 2019, assigned to McAfee LLC, and entitled "SYSTEMS AND METHODS FOR PHISHING AND BRAND PROTECTION", discloses systems, methods, and computer-readable media related to phishing and brand protection via copycat detection. In some embodiments, a temporary page profile associated with a webpage may be generated. The temporary page profile may include an image component, a geometry component, a style component, and a link component. One or more baseline page profiles may be retrieved. The temporary page profile and the one or more baseline page profiles may be compared. It may be determined that the temporary page profile does not match the one or more baseline page profiles. An alert may be generated to display to a user indicating that fraud has been detected for the webpage.

U.S. Pat. No. 8,381,292-B1, issued on Feb. 19, 2013, assigned to UAB Research Foundation, and entitled "SYSTEM AND METHOD FOR BRANDING A PHISHING WEBSITE USING ADVANCED PATTERN MATCHING", discloses a system and method for enhancing spam avoidance efficiency and brand protection by automatically identifying a phishing website without human intervention. The system receives a stream of suspect Internet URLs for potential phishing websites and uses a comparison strategy to determine whether the potential phishing website has already been labeled as a bona fide phishing website. A comparison system is utilized in which similarity data is calculated on various elements of the potential phishing website and then compared to similarity data of known phishing websites and known brands to determine whether the site needs human intervention. Various types of categorization structures and notification strategies are utilized in the system, including the adjustment of threshold comparison values in response to the identification of a potential phishing site displaying a brand of interest.

U.S. Patent Application Publication No.: 2015/0067839-A1, published on Mar. 5, 2015, assigned to UAB Research Foundation, and entitled "SYNTACTICAL FINGERPRINTING", discloses a method for identifying phishing websites and illustrating the provenance of each website through the structural components that compose the websites. The method includes identifying newly observed phishing websites and using the method as a distance metric for clustering phishing websites. Varying the threshold value within method demonstrates the potential capability for phishing investigators to identify the source of many phishing websites as well as individual phishers.

Russian Patent No. 2,676,247-C1, issued on Dec. 26, 2018, assigned to Group-IB TDS, and entitled "METHOD AND COMPUTER DEVICE FOR IDENTIFYING MALICIOUS WEB RESOURCES", discloses methods and systems for warning in regard to cyber threats, especially methods to detect malicious web resources, in particular phishing websites, and mirrors of blocked and/or prohibited websites. The disclosed method comprises receiving, by the computer device, pointers for the plurality of web resources; extracting, by the computer device, at least some of the content elements of each web resource of the plurality of web resources. Iteratively combining, by the computer device, at least two content elements into subgroups and then iteratively combining subgroups into groups in response to a number of web resources including the at least two content elements exceeding a predefined minimum threshold of web resources for the at least one first subgroup and/or group.

SUMMARY

It is an object of the present technology to ameliorate at least some inconveniences present in the prior art.

More specifically, unlike the prior art approaches referenced above, non-limiting embodiments of the present technology are directed to retrieving and analyzing content elements of a given web resource based on images representative of visual content thereof. This enables to improve accuracy of identifying phishing web resources, since different phishing pages using different brands could have the same script (JavaScript) or the same icon, or the same signatures in the HTML code. Thus, the methods and systems described herein are directed to analyzing the content obtained after the browser has performed certain steps to convert HTML, CSS, and JavaScript into a visual image, but not the coded data. The present methods and systems therefore allow decreasing the frequency of false responses in identifying phishing web resources.

In accordance with a first broad aspect of the present technology, there is provided a method for clustering phishing web resources based on images of visual content thereof. The method is executable by a computer device comprising a processor. The method comprises: receiving, by the processor, references to a plurality of phishing web resources; generating, by the processor, for a given phishing web resource of the plurality of phishing web resources, at least one image of a visual content of the given phishing web resource; analyzing, by the processor, the at least one image associated with the given phishing web resource, the analyzing comprising: identifying contours of elements of the visual content of the given phishing web resource within the at least one image; identifying, among the contours, identical contours; and removing the identical contours from further consideration; conducting pairwise comparison between the contours associated with the given phishing web resource and contours of stored clusters of visual content images; determining, by the processor, a respective similarity value between the contours associated with the given phishing web resource and contours of each stored cluster of the stored clusters; in response to the respective similarity value associated with a given stored cluster exceeding a threshold value, adding the at least one image of the visual content of the given phishing web resource to the given stored cluster; in response to the respective similarity value associated with each stored cluster being lower than the threshold value, creating a new cluster for the at least one image of the visual content of the given phishing web resource; and storing, in a database, data indicative of an association between the given phishing web resource and a respective cluster of the at least one image.

In some implementations of the method, the plurality of phishing web resources includes at least two phishing web resources.

In some implementations of the method, the receiving the references to the plurality of phishing web resources comprises scanning a network to which the computing device is communicatively coupled.

In some implementations of the method, the receiving the references to the plurality of phishing web resources comprises receiving at least some thereof from an external source via a network to which the computing device is communicatively coupled.

In some implementations of the method, the receiving the references to the plurality of phishing web resources is from a preliminary-formed web resource database.

In some implementations of the method, the identifying the contours of the elements of the visual content of the given phishing web resource comprises identifying contours of at least one of: logos, letter outlines, individual words, pictures, and forms.

In some implementations of the method, the identifying the contours comprises applying at least one of: a Canny edge detector and a contour tracing algorithm.

In some implementations of the method, the method further comprises, prior to the conducting the pairwise comparison, removing from further consideration at least one of: small-size, oblique, and elongated contours.

In some implementations of the method, the method further comprises, prior to the conducting the pairwise comparison, identifying and removing from further consideration similar contours, the similar contours differing in at least one of a height and a width by no more than two pixels.

In some implementations of the method, the method further comprises, prior to the conducting the pairwise comparison, for a given pair of contours within the at least one image associated with the given phishing web resource differing in at least one of a height and a width by two pixels or less: superimposing the given pair of contours within the at least one image to determine a pixel difference between the given pair of contours; determining, for the pixel difference, a respective similarity score (P) as an arithmetic mean of pixel values from each one of three Red, Green, and Blue (RGB) channels, in accordance with an equation:

$$P = \frac{\sum_{i=1}^{N} Ri + \sum_{i=1}^{N} Gi + \sum_{i=1}^{N} Bi}{N},$$

where Ri, Gi, Bi is an i-th respective pixel value in the Red, Green, and Blue channels, respectively, of the pixel difference between, and N—a total number of pixels in the pixel difference; and if the respective similarity score does not exceed 7, removing the given pair of contours from further consideration.

In some implementations of the method, in response to the respective similarity value associated with the given stored cluster exceeding the threshold value, prior to the adding the at least one image of the visual content of the given phishing web resource to the given stored cluster, the method further comprises: determining a number of similar contours in the contours in the at least one image to respective ones of the stored contours in the given stored cluster; in response to the number of the similar contours being less than two: rejecting the at least one image from adding to the given stored cluster; and generating a warning message about the at least one image being non-representative of the visual content of the given phishing web resource; in response to the number of the similar contours being more than two but less than five, adding the at least one image to the given stored cluster if each one of the similar contours of the at least one image matches the respective ones of the stored contours of the given stored cluster; in response to the number of the similar contours being more than five but less than ten, adding the at least one image associated with the given phishing web resource to the given stored cluster if at least a half of the similar contours of the at least one image matches the respective ones of the stored contours of the given stored cluster; in response to number of the similar contours being more than ten but less than fifteen, adding the at least one image to the given stored cluster if a quarter of the similar contours of the at least one image matches the respective ones of the stored contours of the given stored cluster; in response to number of similar contours being more than fifteen, adding the at least one image to the given stored cluster if a one-fifth of the similar contours of the at least one image matches the respective ones stored contours of the given stored cluster.

The method of claim 1, wherein in response to the respective similarity value associated with the given stored cluster exceeding the threshold value, prior to the adding the at least one image of the visual content of the given phishing web resource to the given stored cluster, the method further comprises: in response to the given stored cluster containing less than two contours, removing the given stored cluster from the stored clusters.

In some implementations of the method, the adding the at least one image of the visual content of the given phishing web resource to the given stored cluster is executed if the given stored cluster has a largest number of matches with the at least one image in contours among the stored clusters.

In some implementations of the method, after clustering respective images of each one of the plurality of phishing web resources, the method further comprises removing clusters containing less than three images.

In some implementations of the method, the method further comprises adding the images of the removed clusters into a list of non-representative images.

In some implementations of the method, the method further comprises creating an adjacency matrix, a given element of which is representative of a number of matched contours between a given pair of the list of non-representative images.

In some implementations of the method, the method further comprises if the number of matched contours is less than a predetermined threshold, replacing a value of the given element of the adjacency matrix with 0, else 1.

In some implementations of the method, the method further comprises determining, based on the adjacency matrix, strongly connected graph components, each of which has more than two images, and determining, based on a given strongly connected graph component, a new cluster.

In accordance with a second broad aspect of the present technology, there is provided a computing device for clustering phishing content. The computing device comprises a processor and a non-transitory computer-readable memory storing instructions. The processor, upon executing the instructions, is configured to: receive references to a plurality of phishing web resources; generate, for a given phishing web resource of the plurality of phishing web resources, at least one image of a visual content of the given phishing web resource; analyze the at least one image associated with the given phishing web resource, by: identifying contours of elements of the visual content of the given phishing web resource within the at least one image; identifying, among the contours, identical contours; and removing the identical contours from further consideration; conduct pairwise comparison between the contours associated with the given phishing web resource and contours of stored clusters of visual content images; determine a respective similarity value between the contours associated with the given phishing web resource and contours of each stored cluster of the stored clusters; in response to the respective similarity value associated with a given stored cluster exceeding a threshold value, add the at least one image of the visual content of the given phishing web resource to the given stored cluster; in response to the respective similarity value associated with each stored cluster being lower than the threshold value, create a new cluster for the at least one image of the visual content of the given phishing web resource; and store, in a database, data indicative of an association between the given phishing web resource and a respective cluster of the at least one image.

In the context of the present specification, the term "network resources" denotes computing devices, i.e., software and hardware complexes configured to exchange data within a computer network, for example, the Internet, and located within the network infrastructure. In a particular example, a given network resource, in terms of this application, could be a workstation connected to a local area network. Also, the given network resource could be a laptop, netbook, tablet, smartphone, Internet of Things (IoT) device, server, router, firewall, or, without limitation, any other software and hardware solution that meets the above criteria.

Further, in the context of the present specification, unless specifically stated otherwise, the term "content element" or "content" refers to any data that could be represented (visually, in audio format, or in some other way) in a visual representation of a given web resource. For example, a content element could be, a font, a menu item, a web resource template, a fill-out form, a written text, an image, a part of the image, graphics, animation, a video, music, voice record, and so on, and also any combination thereof. Also, any other resources that can be transferred via http/https protocols can also be referred as content, in the context of the present specification.

Additionally, in the context of the present specification, the term an "image" of the given web resource visual content, which means denotes a screenshot, that is, an image obtained by a computing device and illustrating exactly what the user sees on the screen of a monitor or other visual output device.

Further, in the context of the present specification, the term "contours" (boxes) denotes closed contours defined around various web elements including, for example, without limitation, buttons, input fields, company logos, title blocks, etc., identified in the visual content image, that is, in the screenshot.

Further, in the context of the present specification, the term "clusters" denotes groups of visual content images (screenshots), formed on the basis of matching the unique contours (boxes) identified therein, for a specific phishing set. A plurality of links (references) to phishing pages corresponding to the visual content images and having much in common (for example, directed to one specific company or similar to each other in landing), is also associated with each cluster, for example, stored in a database with a reference to a specific cluster.

In the context of the present specification, unless clearly specified otherwise, a "locator" or "reference" to an information element could be the information element itself or locator, reference, link (such as a Universal Resource Locator, URL) or other indirect method enabling the recipient of the reference to find a network, memory, database, or other computer-readable medium from which the information element can be retrieved. For example, a web resource locator could include the file itself or a set of web resource files, or it could be a universal resource locator (for example, URL such as www.webpage.com) identifying a web resource with respect to a particular network (in particular, the Internet), or it could be implemented by some other means of transmission of a reference to a network folder, memory address, table in a database or other place where one can access a web resource or its individual content elements, to the recipient.

In the context of the present specification, unless expressly provided otherwise, a computer system may refer, but is not limited, to an "electronic device", an "operation system", a "system", a "computer-based system", a "controller unit", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented, or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

BRIEF DESCRIPTION OF THE DRAWINGS

Non-limiting embodiments of the present technology are described herein with reference to the accompanying drawings; these drawings are only presented herein to explain the essence of the technology and are not intended to limit the scope thereof in any way, where.

DETAILED DESCRIPTION

The following detailed description is provided to enable anyone skilled in the art to implement and use the non-limiting embodiments of the present technology. Specific details are provided merely for descriptive purposes and to give insights into the present technology, and in no way as a limitation. However, it would be apparent to a person skilled in the art that some of these specific details may not be necessary to implement certain non-limiting embodiments of the present technology. The descriptions of specific implementations are only provided as representative examples. Various modifications of these embodiments may become apparent to the person skilled in the art; the general principles defined in this document may be applied to other non-limiting embodiments and implementations without departing from the scope of the present technology.

Figure 1:
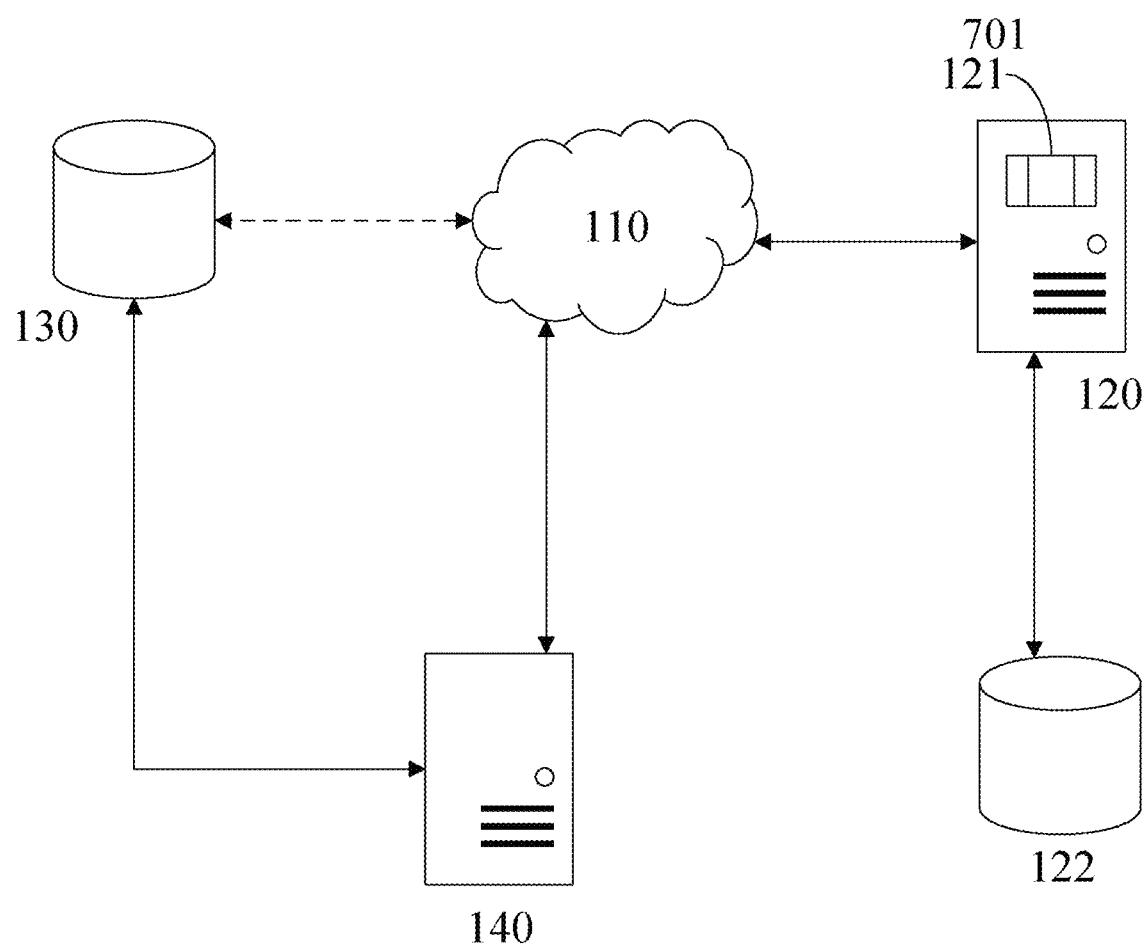
FIG. 1 depicts a schematic diagram a system configured to be used for implementation of certain non-limiting embodiments of the present technology.

FIG. 1 depicts a schematic diagram of a system 100 configured for clustering phishing web resources, in accordance with certain non-limiting embodiments of the present technology.

In some non-limiting embodiments of the present technology, the system 100 may include a data transmission network 110, a computing device 120 configured for detecting malicious web resources, and a database 130.

In some non-limiting embodiments of the present technology, the system 100 may also include a search server 140 communicatively coupled to the database 130. In the other non-limiting embodiment of the present technology, the system 100 may additionally include active network equipment (not shown) and a client device (not shown).

In some non-limiting embodiments of the present technology, the data transmission network 110 can be the Internet. In alternative non-limiting embodiments of the present technology, the data transmission network 110 can be implemented as any suitable local area network (LAN), wide area network (WAN), a private communication network, or the like. It should be expressly understood that implementations for the data transmission network 110 are for illustration purposes only. How a respective communication link (not separately numbered) between each one of the computing device 120, the database 130, and the search server 140 and the data transmission network 110 is implemented will depend, inter alia, on how each of these devices is implemented. Merely as an example and not as a limitation, in those embodiments of the present technology where the computing device 120 is implemented as a wireless communication device such as the smartphone, the communication link can be implemented as a wireless communication link. Examples of wireless communication links include, but are not limited to, a 3G communication network link, a 4G communication network link, and the like. The data transmission network 110 may also use a wireless connection with the computing device 120.

According to certain non-limiting embodiments of the present technology, the computing device 120 could be a conventional computer server. In an exemplary embodiment of the present technology, the device 120 could be Dell™ PowerEdge™ server, or it could be any other suitable hardware and/or application software and/or system software, or a combination thereof. To that end, the computing device 120 can include at least some or all components of a computing environment 700, such as a processor 701, which will be described below with reference to FIG. 7.

In some embodiments of the present technology, the computing device 120 includes a device database 122 that is configured to store at least part of references to content elements, content elements, group of content elements, and a reference to web resources associated with the corresponding content element or group of content elements. Thus, by way of example, a web resource that contains all the content elements from the group of content elements is associated with that group of content elements.

It is worth noting that the device database 122 could be implemented as part of the computing device 120 or otherwise be accessible for the computing device 120.

In some non-limiting embodiments of the present technology, the computing device 120 can include a computer-readable medium (not shown) configured to store computer-readable instructions. Thus, the computing device 120 could have access to the computer-readable instructions and/or device database 122 located in the other equipment. The way in which the processor 701 of the computing device 120 accesses the computer-readable instructions and the device database 122 is not limited.

Further, according to certain non-limiting embodiments of the present technology, the processor 701 can be configured to receive references to a plurality of web resources, such as a list of uniform resource locators (URLs). Additionally, it is worth noting that the sources of references to the plurality of web resources could be different.

In some non-limiting embodiments of the present technology, the processor 701 can be configured to receive the references to the plurality of web resources at least in part from an external source over the data transmission network 110. For example, the external source could be the search server 140 coupled to the database 130 and/or malicious web resource data collection server (not shown), etc. Further, the computing device 120 could access the database 130 over the data transmission network 110. In alternative non-limiting embodiments of the present technology, the external source could be a web resource that includes references to the plurality of web resources (for example, a verified database of phishing web resources like Google Safe Browsing (GSB), OpenPhish (OP).

According to non-limiting embodiments of the present technology, the search server 140 can be implemented similarly to the computing device 120, and thus can also include some or all components of the computing environment 700.

Thus, in some non-limiting embodiments of the present technology, the search server 140 can be configured to crawl the data transmission network 110, thereby populating the database 130, wherein the search server 140 is configured to browse various web resources available over the data transmission network 110, and store them in the database 130 according to one or more predefined parameters. By way of non-limiting example, the search server 140 may scan the data transmission network 110 and store any new and updated web resources, and thus populate the complete database 130 of the data transmission network, and/or collect web resources, for example, including certain keywords in one or more languages. Since malicious web resources (in particular, phishing websites) usually try to imitate the websites of banks, payment systems and e-mail services, the keywords could be, for example, but not limited to: "bank", "credit", "card", etc. The search could also be carried out by domain names and/or other parameters. Identified and selected references to web resources are stored in the database 130, after that they could be received by the processor 701 of the computing device 120 over the data transmission network 110 from the search server 140.

Further, in some non-limiting embodiments of the present technology, the search server 140 can be configured to explore at least part of the content elements of each web resource from the plurality of web resources. Web resource content elements could be files of content elements and/or hash sums of content element files (e.g., hash sums computed by sha256 algorithm). Format of content element files is not specifically limited and will depend on the type of specific content element. For example, in case, where the content element is an image, the file could be presented, in particular, in one of the following formats: "jpg", "jpeg", "png", "bmp", "gif", etc. In case, where the content element is a text, the file could be presented, in particular, in one of the following formats: "txt", "doc", "html", etc. In case, where the content element is a font, the file could be presented, in particular, in one of the following formats: "woff", "ttf," "eot", "svg", etc. In case, where the content element is a script, the file could be presented, in particular, in one of the following formats: "asp", "aspx", "php", "jsp", "cgi", etc. In case, where the content element is animation or video, the file could be presented, in particular, in one of the following formats: "fly", "swf", "avi", "mp4", "mov", etc. In case, where the content element is a cascading style sheet, the file could be presented, in particular, in "css" format. The specified list of possible content elements and formats in which they could be presented is not a limiting condition of the present technology.

Further, according to certain non-limiting embodiments of the present technology, the extraction of elements, and also creation of visual content images (screenshots) of the identified web resources could be executed by the search server 140 using specially written scenarios and/or scripts for browsers. Also, in other non-limiting embodiments of the present technology, the described function of creating visual content images could be executed by the processor 701 of the computing device 120.

In specific embodiments of the present technology, the visual content image (screenshot) could be obtained by the processor 701 of the computing device 120 using Selenium WebDriver, a tool for automating the actions of web browser using <.save_screenshot (filename)> or <.get_screenshot_as_file (filename)> method and be stored in the device database 122.

In alternative non-limiting embodiments of the present technology, the processor 701 of the computing device 120 can be configured to receive references to the plurality of web resources directly from the database 130. Moreover, the database 130 could be accessible for the computing device 120 over the data transmission network 110.

Further, in some non-limiting embodiments of the present technology, the processor 701 can be configured to scan the data transmission network 110 for receiving references to the plurality of web resources, and thus, the computing device 120 can perform the functions of the search server 140 described above. For example, the processor 701 can be configured for network scanning by IP addresses of web resources, domain names, keywords, and other parameters.

The processor 701 of the computing device 120 can also be configured to process the obtained elements and also images of visual content of the web resources for clustering phishing content, and also to group them based on the specific similarity threshold values.

Figure 2:
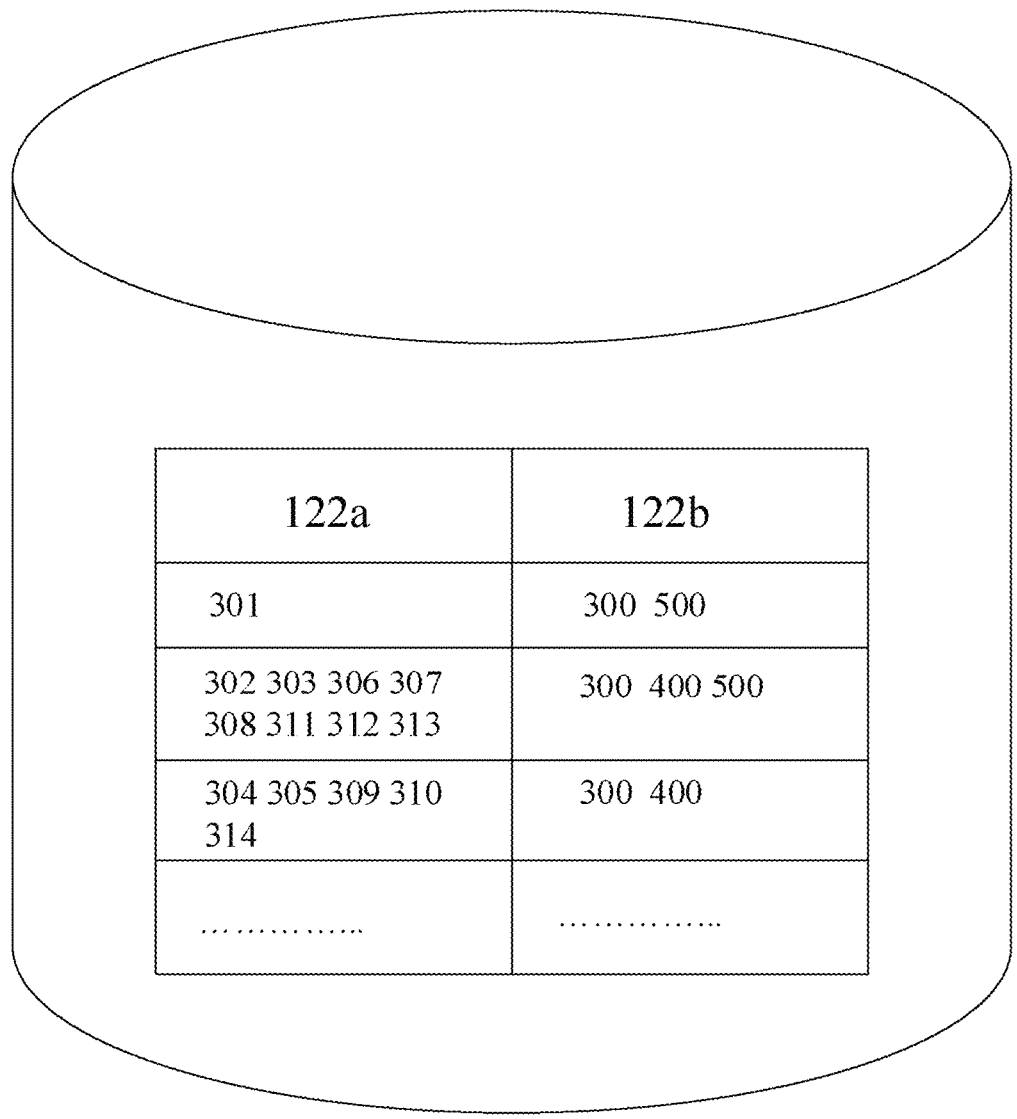
FIG. 2 depicts a schematic diagram of a resource database configured for storing information of web page resources, in accordance with certain non-limiting embodiments of the present technology.

FIG. 2 depicts a schematic diagram of the device database 122 including data on contours of content elements (122*a*) and web resources (122*b*) associated with the corresponding contours of content elements, in accordance with certain non-limiting embodiments of the present technology.

In the illustrative example of the device database 122 there is a given cluster of associated web resources 300, 400, 500 based on identified element boxes 302, 303, 306, 307, 308, 311, 312, 313.

It should be noted that a number and quality of records in the device database 122 is not limited, the examples of the identified content element boxes and the given cluster of web resources created based thereon are given only for purposes of understanding of the present technology and are not limited.

Figure 3:
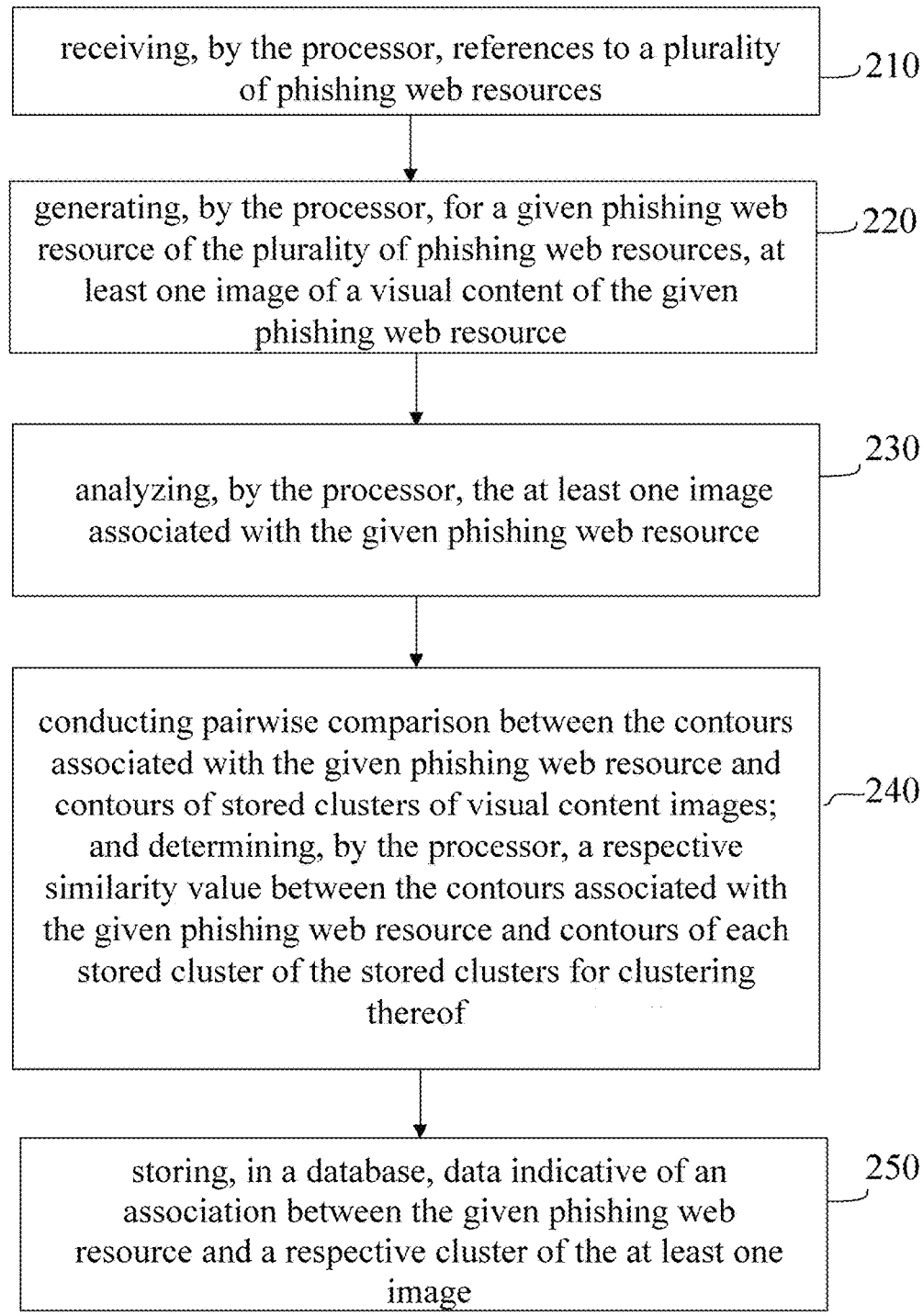
FIG. 3 depicts a flowchart diagram of a method for clustering phishing web resources based on visual content image thereof, in accordance with certain non-limiting embodiments of the present technology.

With reference to FIG. 3, there is depicted a flowchart diagram of a method 200 for clustering phishing web resources based on visual content image thereof, in accordance with certain non-limiting embodiments of the present technology. The method 200 may be executed by the processor 701 of the computing device 120.

Figure 4:
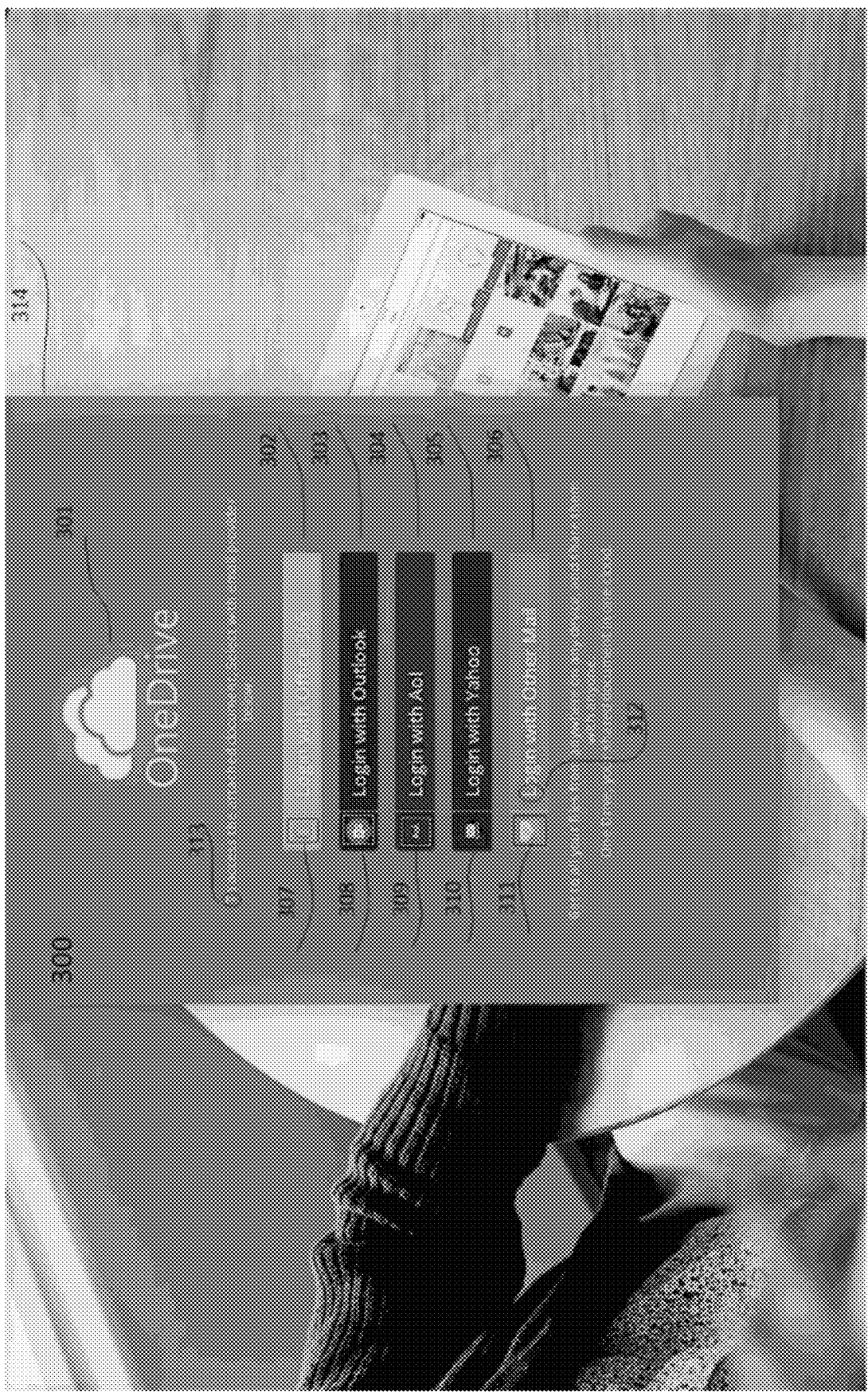
FIG. 4 depicts a schematic diagram of a Graphical User Interface (GUI) of a first web resource, in accordance with certain non-limiting embodiments of the present technology.
Figure 5:
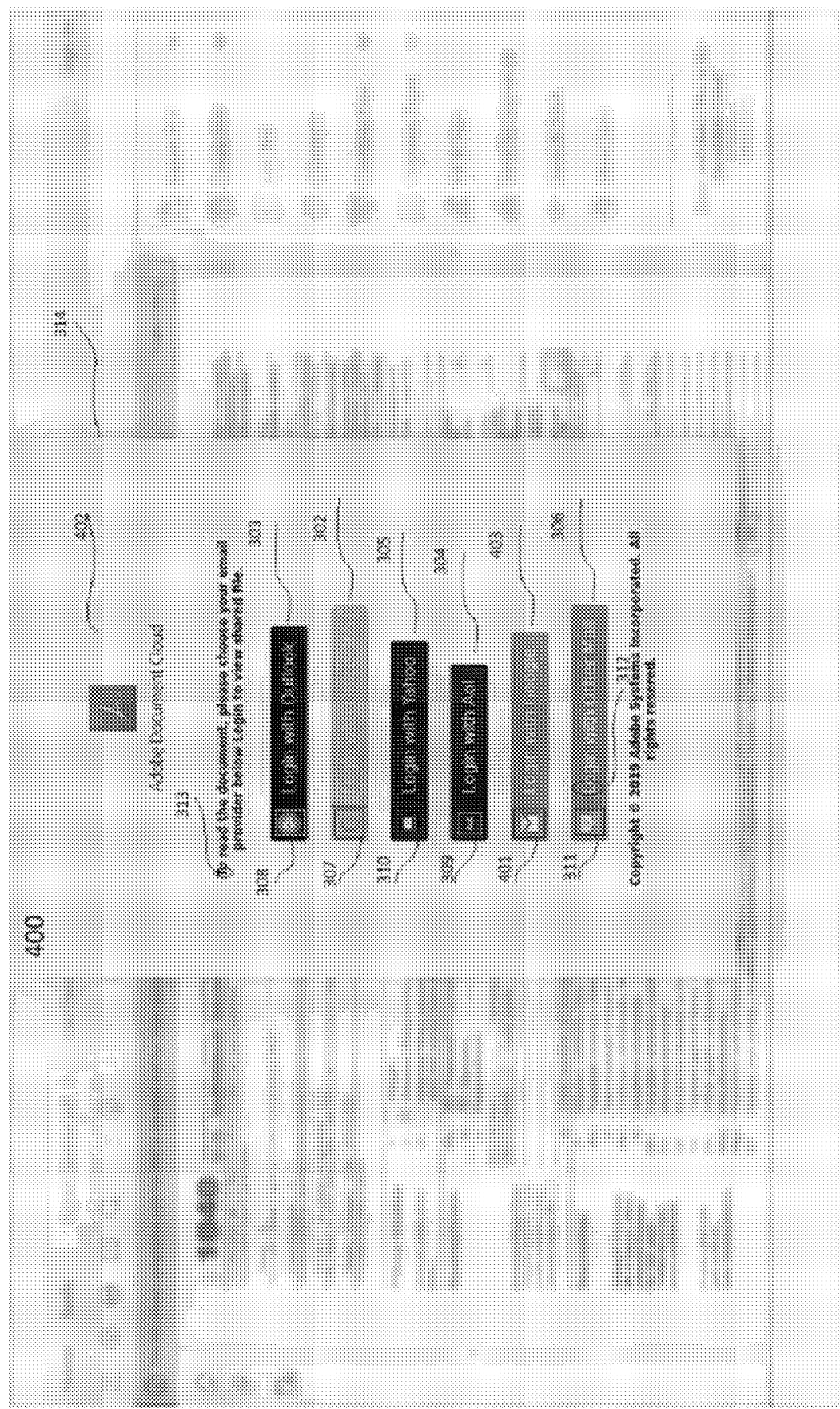
FIG. 5 depicts a schematic diagram of a GUI of a second web resource, in accordance with certain non-limiting embodiments of the present technology.
Figure 6:
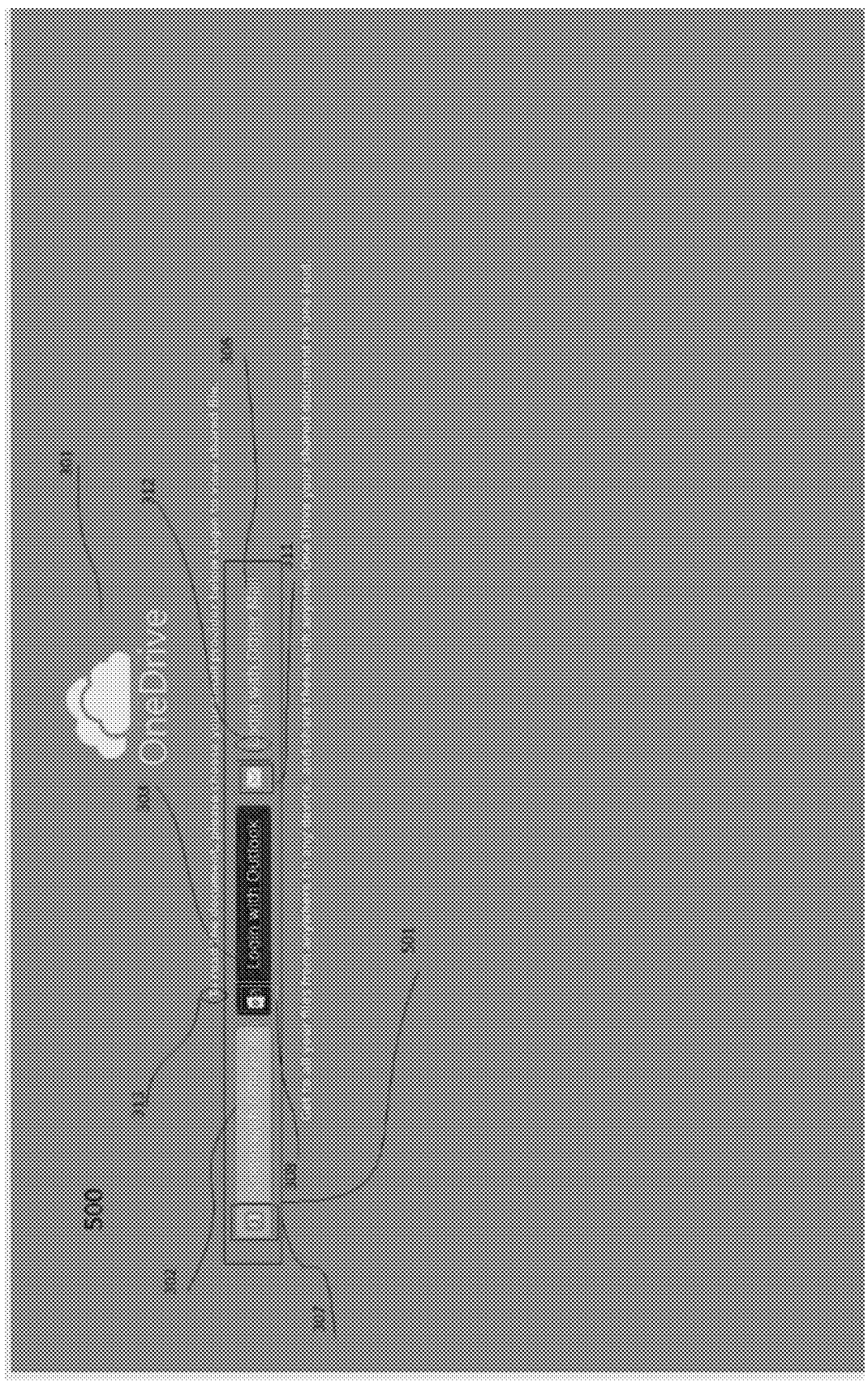
FIG. 6 depicts a schematic diagram of a GUI of a third web resource, in accordance with certain non-limiting embodiments of the present technology.

Also, with continued reference to FIG. 3, and with reference to FIGS. 4 to 6, there are depicted examples of visual content images aiding in explaining the method 200, in accordance with certain non-limiting embodiments of the present technology.

More specifically, FIG. 4 depicts a first visual content image of a first web resource 300 including a first set of dedicated contours 301-314. As it can be appreciated, contours 302-306 represent respective button elements for redirecting from the first web resource 300 to respective third-party resource, contours of the elements 301, 307-311 represent brand logos, contours 312-313 represent characters, and a contour 314 represent dedicated rectangular area comprising the rest of the elements.

Further, FIG. 5 depicts a second visual content image of a second web resource 400 including a second set of content elements. Moreover, some contours of the content elements, namely 302-314, are also present in the first web resource 300, as described above. Additionally, the second web resource 400 comprises elements 401, 402, 403.

Further, FIG. 6 depicts a third visual content image of a third web resource 500, including a third set of content elements, in particular, 301, 302, 303, 306, 307, 308, 311, 312, 313, 501. Content elements 302, 303, 306, 307, 308, 311 312, 313, which are also present in the first and second web resource 300, 400, and 301 is present only in the first web resource 300, have been described above. Content element 501 is a string comprising buttons to navigate to a respective third-party web resources.

According to the non-limiting embodiments of the present technology, the number and types of different content elements is not limited. The web resources in FIG. 4, FIG. 5 and FIG. 6 are presented only as illustrative examples, and any other web resources that have more or less content elements, wherein, the types of content elements and the content itself may or may not be repeated within one and the same web resource, are also envisioned without departing from the scope of the present technology. Some content elements available in the presented illustrative examples of web resources are not numbered.

Step 210: Receiving References to a Plurality of Phishing Web Resources

The method 200 begins at step 210 where the processor 701 of the computing device 120 receives the references to the plurality of web resources containing phishing content.

The references to the plurality of web resources could be, for example, links to web resources, URLs, accessible over the data transmission network 110 or another network (not shown) to which the computing device 120 is communicatively coupled.

In a non-limiting illustrative example, the processor 701 of the computing device 120 at step 210 receives references to the plurality of web resources including three web resources, the first, second, and third web resources 300, 400, and 500 mentioned above. As mentioned above, the processor 701 can be configured to receive the first, second, and third 300, 400, and 500 from an external source, such as one of the search server 140 and the database 130, s an example. For example, the web resources 300, 400, and 500 could be previously found by the search server 140 and stored in the database 130. Also, the references to the plurality of web resources could be obtained at least in part from the database 130, and in additional non-limiting embodiments of the present technology, the computing device 120 can receive the references to the plurality of web resources directly from the database 130.

Additionally, in other non-limiting embodiments of the present technology, the computing device 120 can be configured to scan the data transmission network 110 to obtain the references to the plurality of web resources. Scanning of the data transmission network 110 could be performed by the computing device 120 similarly to the search server 140, as described above, or otherwise using available software capable of searching according to the specified parameters in the network.

In yet other non-limiting embodiments of the present technology, the processor 701 of the computing device 120 can be configured to obtain the references to the plurality of web resources is obtained from at least two different sources. For example, references to first and second web resources 300 and 500 can be obtained from the search server 140 from the database 130, and a reference to the third web resource 400 can be obtained from the other external source (not shown, for example, from a special external database of phishing web resources) over data communication networks 110.

In additional non-limiting embodiments of the present technology, obtained URL can lead to a folder with files (for example, js, css, image, etc.), and does not correspond to usual display of web pages, then the computing device 120 connects, over the data transmission network 110, to an external service (not shown), for example, to 'scan-open-dir', which examines all the folders found at the specified address, and also returns the result back to the computing device 120, which, using specially written parsers, processes this information and distributes it in the device database 122.

Then the method 200 hence proceeds to step 220.

Step 220: Generating, by the Processor, for a Given Phishing Web Resource of the Plurality of Phishing Web Resources, at Least One Image of a Visual Content of the Given Phishing Web Resource At step 220, the processor 702 of the computing device 120 can be configured to obtain at least one visual content image for a given web resource of the plurality of web resources the references to which were obtained at step 210.

In some non-limiting embodiments of the present technology, the at least one visual content image could be rendered by the search server 140 and stored in the database 130, or rendered by the processor 701 of the computing device 120 and stored in the device database 122 by any technique.

Just as an example, such techniques can include use of virtual browsers (e.g., Selenium). An extension can be installed in the virtual browser settings, cache is cleared, transition to the given web resource is performed, then the at least one visual content image of this web resource is automatically saved in the specified location. Moreover, any available software, a script written in any programming language and capable of being interpreted by the system for obtaining the desired visual content image, could be used for the same purposes.

Thus, the method 200 proceeds to step 230.

Step 230 Analyzing, by the Processor, the at Least One Image Associated with the Given Phishing Web Resource At step 230, the processor 701 can be configured to analyze the at least one visual content image to identify therein contours of content elements of the given web resource.

According to certain non-limiting embodiments of the present technology, to analyze the at least one visual content image, the processor 701 can be configured to execute at least one of:
- contouring the elements in the at least one visual content image of the given web resource; and
- identifying and filtering out identical contours in the at least one visual content image.

For example, in some non-limiting embodiments of the present technology, the processor 701 can be configured to identify, in the at least one visual content image, contours of at least one of the following content elements: logos, letter outlines, individual words, pictures, forms. Other content elements are also envisioned. To that end, in some non-limiting embodiments of the present technology, the processor 701 can be configured to apply one of a Canny edge detector and a contour tracing algorithm.

As it can be appreciated, contours in the visual content image are curves in the image along which there is a sharp change in brightness, colour, or other parameters of the image. Therefore, the goal of the identifying the contours within the at least one visual content image is extraction of essential image characteristics and reducing the amount of information for subsequent analysis.

Further, according to certain non-limiting embodiments of the present technology, while identifying the contours in the at least one visual content image, such as by applying the Canny edge detector, the processor 701 can be configured to execute at least the following steps:
- removing noise and unnecessary details from the at least one visual content image by applying the Gaussian filter, computing the first derivatives (magnitudes and directions) of a pixel intensity function associated with the at least one visual content image in horizontal and vertical directions thereof by applying the Sobel operator;
- selecting pixels that potentially belong to the edge using a non-maximum suppression procedure, wherein the pixels, whose vectors of directional derivatives correspond to local maxima, are considered potential candidates for belonging to the edge; and
- performing double clipping, that is, highlighting "strong" and "weak" edges, where pixels, which intensity exceeds a first predetermined intensity threshold, are considered as pixels belonging to the "strong" edges. It is assumed that pixels with intensity is in a range between second and first predetermined intensity threshold are identified as being "weak" edges, the second predetermined intensity threshold being lower than the first one. Pixels, which intensity is below the second predetermined intensity threshold, are removed from further consideration. Thus, the processor 701 can be configured to identify pixels of all "strong" edges and those pixels of "weak" edges, whose neighborhood comprises at least one pixel of "strong" edges.

Additionally, the processor 701 can be configured to apply the contour tracing algorithm which can include, but not limited to, a Kirsch operator, a Robins operator, a Marr-Hildreth and Harris algorithms, and also its modifications, such as Shea-Thomas, Harris-Laplace, etc.

After contouring, according to some non-limiting embodiments of the present technology, the processor 701 can be configured to delete small, inclined (or otherwise oblique), and highly elongated contours. For example, but not as a limitation, the processor 701 can be configured to delete, within the at least one visual content image, contours, which are less than 350 pixels, and contours, whose width or height is less than 10 pixels. Contours, which edges are not parallel to sides of the visual content image, can be considered inclined and can also be deleted by the processor 701.

In some non-limiting embodiments of the present technology, the above criteria for deleting the contours could be predetermined by an expert or generated automatically based on statistic data about use of content elements in the plurality of web resources. For example, if a predetermined threshold value of the number of web resources associated with a given content element is exceeded, it could be considered as a standard content element. Threshold value can be set manually by an operator, or be selected using various automated algorithms, including machine learning ones.

Further, in some non-limiting embodiments of the present technology, the processor 701 of the computing device 120 can be configured to conduct pairwise comparison to identify similar contours in the at least one visual content image, wherein:

- if a given pair of compared contours identified in the at least one visual content image differ in height and/or width by more than 2 pixels, the processor 701 can be configured to determine these contours as being different;
- if the given pair of compared contours differ in height and/or width by 2 pixels or less, the processor 701 can be configured to (i) superimpose them on each other to determine a pixel difference therebetween, and (ii) determine a similarity score for the pixel difference taking values from 0 to 100, where 0 means the given pair of compared contours includes the same contours, and 100 denotes that the contours are completely different; and
- if the similarity score does not exceed a predetermined similarity threshold, such as 7, the processor 701 can be configured to determine each one of the given pair of compared contours as being similar to each other, and further remove the given pair of compared contours from further consideration.

In some non-limiting embodiments of the present technology, the processor 701 can be configured to determine the similarity score (P) for the pixel difference as an arithmetic mean of pixel values (1), that is, respective sums of pixel values taken from each one of three RGB channels of the pixel difference and divided by a total number of pixels in the pixel difference, in accordance with an equation:

$$P = \frac{\sum_{i=1}^{N} Ri + \sum_{i=1}^{N} Gi + \sum_{i=1}^{N} Bi}{N} \quad (1)$$

where Ri, Gi, Bi is an i-th respective pixel value in the Red, Green, and Blue channels, respectively, of the pixel difference, and N—the total number of pixels in the pixel difference.

In alternative non-limiting embodiments of the present technology, the processor 701 of the computing device 120 can be configured to apply a similar contour removal method, including:

- if the given pair of compared contours differ in height or width by more than 2 pixels, determining each one of the given pair of compared contours as being different;
- if one of the contours is larger than the other one, then, successively comparing all pre-determined locations, such as 9, of a smaller contour in a larger one, determining the pixel difference between the superimposed contours, and determining the similarity score (1) is calculated for the difference, and removing from further consideration the contours, whose similarity score does not exceed the predetermined similarity threshold.

It should be noted that less or more than 9 locations of the smaller contour in the larger one can be used for comparison thereof, depending on the difference in one of the coordinates.

In alternative non-limiting embodiments of the present technology, in case when one of the contours is larger than the other one, the difference in width is taken as delta, and at least one location is searched to obtain the pixel difference between the given pair of compared contours with displacements:

$$0, \frac{delta}{2},$$

delta in relation to the upper left corner. The same actions could be performed in case when the contours differ in height.

In an illustrative embodiment of the present technology, in case where the first contour is larger in width and the second one in height, the contours are aligned in width using at least the following displacement options:

$$0, \frac{delta}{2},$$

delta in relation to the upper left corner and then they are compared, so that the first contour lies inside the other one. Accordingly, the maximum difference in height/width can be 2 pixels, therefore, displacements, for example, in 0, 1 and 2 pixels are considered, while the contour that is larger in width/height is clipped according to the corresponding size of the smaller contour, that is, if the pixel difference between the contours was 2 pixels wide, then the large contour is clipped in three ways: 2 pixels on the right; by 1 pixel on the left and on the right; and 2 pixels on the left. Then, when comparing the obtained contours, the processor 701 can be configured to determine the similarity score (according to equation (1)), and if the contours are similar, remove one of them. Moreover, in this case, if in any of the predetermined, such as 9, overlays, the similarity score is less than the predetermined similarity threshold, then the contours are considered to be similar.

The method hence advances to step 240.

Step 240: Conducting Pairwise Comparison Between the Contours Associated with the Given Phishing Web Resource and Contours of Stored Clusters of Visual Content Images; and Determining, by the Processor, a Respective Similarity Value Between the Contours Associated with the Given Phishing Web Resource and Contours of Each Stored Cluster of the Stored Clusters for Clustering Thereof At step 240, the processor 701 of the computing device 120 can be configured to (i) conduct pairwise comparison between the identified contours in the at least one visual content image associated with the given web resource and stored contours associated with stored clusters; (ii) determine a respective similarity score, for example, in accordance with equation (1), between the contours of the at least one visual content image and those of a given stored cluster; and (iii) if the respective similarity score exceeds the threshold value, add the at least one visual content image to the given stored cluster; if the respective similarity score associated with each and every one of the stored clusters does not exceed the threshold value, create a new cluster for this visual content image.

In some non-limiting embodiments of the present technology, the processor 701 can be configured to form the clusters of groups of images associated with web resources based on the similarity of the identified unique contours (boxes).

In some non-limiting embodiments of the present technology, the cluster structure includes a collection of immediate images of the visual content of a web resource associated with a respective reference thereto, and also the contours identified in the images, while additionally for each contour in the cluster, time of its last match and the number of subsequent mismatches are assigned and stored when adding a new image to the cluster.

As an illustrative example, as mentioned above, after adding the first visual content image of the first web resource 300 to the cluster, all the contours highlighted therein become the cluster contours. Then, when adding the second visual content image of the second web resource 400, the contours 302, 303, . . . 314 match with the contours identified in the image 300, and time of their match is assigned to them. Number 1, which indicates that this contour has not matched when adding a new image to the cluster once, is assigned to the contour 301, and the contours 401, 402, 403 are added to the cluster contours. Further, when adding the third visual content image of the third web resource 500 to this cluster, the contours 301, 302, 303, 306, 307, 308, 311, 312, 313 are assigned with a new time value of their match, and for the contours 304, 305, 309, 310, 314, 401, 402, 403 the mismatch counter is increased by one; with the contour 501 being added to the cluster contours.

In accordance with certain non-limiting embodiments of the present technology, after conducting the pairwise comparison of visual content images, the processor 701 can be configured to determine if the respective similarity score between the contours of the at least one visual content image and the those of the given stored cluster exceeds the predetermined similarity threshold value: if so, the processor 701 can be configured to add the at least one image to the given stored cluster.

By way of example, but not limited to, with reference to FIG. 3, 4, 5, according to the method 200, first, the processor 701 can be configured to process the first visual content image of the first web resource 300 of FIG. 3, identifying contours thereon. After that, the identified contours are pairwise compared with the cluster contours (at the described moment the cluster contours are absent in the device database 122 and their counter is set to 0), and the processor 701 is configured to create a given cluster including only the first visual content image illustrated in FIG. 3 and store the given cluster in the device database 122, since the similarity score is P (1) in none of the cases does not exceed the similarity threshold value. In this case, the created cluster comprises the first visual content image of the first web resource 300, a reference to it, and also all the contours identified therein, namely 301, 302 . . . 312. Then, the processor 701 can be configured to proceed to clustering the second visual content image illustrated in FIG. 4. As it can be appreciated, this visual content image has identical contours with the cluster formed earlier based on processing of the first visual content image (302 . . . 313). Number of matching contours of the second web resource 400 and contours of the given cluster created on the basis of the first visual content image of the first web resource 300 exceeds a given threshold, which means that the second visual content image of the second web resource 400 is added to the given cluster, while the contours 401, 402 identified only for the second web resource 400 are added to the cluster contours.

In some non-limiting embodiments of the present technology, the processor 701 can be configured to process each contour in the multithreading mode, namely, to find in the device database 122 all contours, which difference in size does not exceed a pre-set number of pixels, for example, two pixels in width and/or height, and to form many similar contours from them.

Accordingly, in some non-limiting embodiments of the present technology, the processor 701 can be configured to form at least two tables in the device database 122, wherein the first table includes information on the number of visual content images in which each of the contours identified in the at least one visual content images has been identified, to each available cluster, and the second table shows the total number of contours included in each cluster. Based on the information contained in these tables, the clusters, in which the total number of matching contours to those of the at least one image associated with the given web resource is less than 85% are deselected (removed). In this case, if after removal there are more than fifteen clusters subject to further verification, then, fifteen clusters with the largest number of matches are selected from them.

Exemplary variants of the above tables are given below, namely Table 1, which includes the information about association between each identified contour and each of the stored clusters, and Table 2, containing information about the total number of contours in each cluster. It is also worth noting that the specific data in Tables 1 and 2 are given for illustrative purposes only, instead of these data there could be any other numerical values obtained when performing the method 200, among other things, the tables may contain other numbers of rows and columns.

TABLE 1

|  | Cluster 1 | Cluster 2 | Cluster N |
| --- | --- | --- | --- |
| Contour 1 | 3 | 5 | 10 |
| Contour 2 | 7 | 8 | 9 |
| Contour 3 | 0 | 1 | 1 |

TABLE 2

|  | Cluster 1 | Cluster 2 | Cluster N |
| --- | --- | --- | --- |
| Total number of contours associated with the cluster | 70 | 90 | 40 |

Further, according to some non-limiting embodiments of the present technology, the processor 701 can be configured to additionally compare the contours of each stored cluster in the device database 122 and the contours of the analyzed a least one visual content image in the multithreading mode, while combining the matched contours and highlighting all the clusters comprising the matched contours in accordance with Table 1.

Also, at this step, after determining the respective similarity scores, in order to add the at least one visual content image to the cluster, each of the contours identified in the at least one image is compared in multithreading mode with each of the contours present in each of the stored clusters.

More specifically, according to certain non-limiting embodiments of the present technology, the processor 701 can be configured to conduct the comparison in the multithreading mode between the contours, as follows:
- determining a number of similar contours in the contours in the at least one visual content image to respective ones of the stored contours in the given stored cluster;
- in response to the number of the similar contours being less than two:
  - rejecting the at least one visual content image from adding to the given stored cluster; and
  - generating a warning message about the at least visual content one image being non-representative of the visual content of the given web resource;
- in response to the number of the similar contours being more than two but less than five, adding the at least one visual content image to the given stored cluster if each one of the similar contours of the at least one visual content image matches the respective ones of the stored contours of the given stored cluster;
- in response to the number of the similar contours being more than five but less than ten, adding the at least one visual content image associated with the given web resource to the given stored cluster if at least a half of the similar contours of the at least one visual content image matches the respective ones of the stored contours of the given stored cluster;
- in response to number of the similar contours being more than ten but less than fifteen, adding the at least one visual content image to the given stored cluster if a quarter of the similar contours of the at least one visual content image matches the respective ones of the stored contours of the given stored cluster; and
- in response to number of similar contours being more than fifteen, adding the at least one visual content image to the given stored cluster if a one-fifth of the similar contours of the at least one visual content image matches the respective ones stored contours of the given stored cluster.

In additional non-limiting embodiments of the present technology, the processor 701 can be configured to determine a number of stored contours in the given stored cluster; and in response to the given stored cluster containing less than two contours, the processor 701 can be configured to remove the given stored cluster from the stored clusters. Thus, in certain non-limiting embodiments of the present technology, the processor 701 can be configured to create clusters from the visual content images including at least three contours identified.

In some non-limiting embodiments of the present technology, the processor 701 can be configured to identify, for the at least one visual content image, several clusters, and further add the at least one visual content image to the cluster with the largest number of contour matches. Besides, this embodiment provides for verifying a possibility of combining the identified clusters.

More specifically, in some non-limiting embodiments of the present technology, the processor 701 can be configured to combine clusters based on pairwise comparison between contours thereof, such as described above. Thus, if a given pair of clusters a number of similar contours exceeds a predetermined threshold, the processor 701 can be configured to combine the given pair of clusters in a single cluster. In other words, all the contours of a first cluster of the given pair of clusters are compared with all the contours of a second one, as described above.

The method 200 thus proceeds to step 250.

Step 250: Storing, in a Database, Data Indicative of an Association Between the Given Phishing Web Resource and a Respective Cluster of the at Least One Image At step 250, the processor 701 can be configured to store, for example, in the device database 122, data indicative of an association between the given web resource and one of the given one of the stored clusters or the new cluster, depending on the respective similarity scores between the contours identified in the at least one visual content image and those of the stored clusters and meeting the conditions described at step 240. In other words, at this step, the information about which web resources belong to which clusters of the presumably phishing web resources is stored in the device database 122.

In some non-limiting embodiments of the present technology, the processor 701 can further be configured to transmit the clusters identified and stored in the device database 122 to external devices (not shown in the figures) for further attribution of phishing web resources, web resource mirrors, blocked or illegal websites.

In additional non-limiting embodiments of the present technology, after clustering all the visual content images, the processor 701 can be configured to delete the clusters comprising less than a predetermined number of visual content images, for example, for better understanding, less than three images of visual content. Such images are entered into a special list stored in the device database 122, and are temporarily considered as non-representative images, or other wise "garbage" images.

Then, at least once per certain period of time, the processor 701 can be configured to access the list of non-representative images of visual content and their corresponding contours for filtering undescriptive images of web resources.

After filtering, the processor 701 can be configured to generate an adjacency matrix for the remaining visual content images in the list of non-representative images, in which the remaining "garbage" images from 1 to N are represented both in rows and columns, and number of matching contours is filled in at the intersection of rows and columns. In other words, a given element of the adjacency matrix is representative of a number of matched contours between a given pair of the list of non-representative images. The generated adjacency matrix is further used for identifying a list of unique pairs of contours similar in size and associated with the images by the computing device 120.

Table 3 shows a non-limiting example of the adjacency matrix. As it can be appreciated, the specific data in Table 3 are given for illustrative purposes only, instead of this data there could be any other numerical values obtained when performing the method 200, among other things, the matrix may contain other numbers of rows and columns.

TABLE 3

|         | Image 1 | Image 2 | Image N |
|---------|---------|---------|---------|
| Image 1 | 0       | 19      | 12      |
| Image 2 | 19      | 0       | 5       |
| Image N | 12      | 5       | 0       |

In some non-limiting embodiments of the present technology, after the processor 701 of the computing device 120 has identified a list of similar-sized contours, the processor 701 can further be configured to conduct pairwise comparison of the contours comprised in the list in the multithread mode, as described above, and only the most similar pairs of contours are left. The information about contours intersection is entered into the adjacency matrix stored in the device database 122 for those visual content images which these contours belong to.

In this case, for each unique pair of images contained in the list, for example, with reference to Table 3, for image 1 and image 2, the contours are superimposed on each other to identify the number of similar pairs of contours and, if in some contours pair the contours are similar to each other, then, in the initially generated adjacency matrix, where everything was pre-filled with 0, the number in the corresponding cell is increased by 1. In this example, as can be seen from Table 3, 19 similar pairs of contours have been found for this pair of images.

Then, in order to confirm the association of web resource pairs based on pairs of their visual content images, the adjacency matrix is checked line by line. If the number of contours matched in each pair of images exceeds a predetermined threshold, one is put down in the corresponding cell of the matrix. If the number of matched contours is less than a predetermined threshold, zero is put down in the corresponding cell. A non-limiting example of the so transformed adjacency matrix is shown in Table 4.

TABLE 4

|         | Image 1 | Image 2 | Image N |
|---------|---------|---------|---------|
| Image 1 | 0       | 1       | 1       |
| Image 2 | 1       | 0       | 0       |
| Image N | 1       | 0       | 0       |

In some non-limiting embodiments of the present technology, the processor 701 can be configured to determine strongly connected graph components of the adjacency matrix. In fact, at this step, a maximally connected subgraph is constructed, where any vertex is reachable from any other graph vertex. It should be noted that methods of generating strongly connected graph components based on the adjacency matrix above are not limited.

For example, in some non-limiting embodiments of the present technology, the processor 701 can be configured to use one of a Trajan algorithm with modifications of Nuutil or a non-recursive Tarjan algorithm to determine the strongly connected components.

Each such constructed subgraph forms a new cluster of visual content images. Additionally, it should be noted that a cluster constructed from the "garbage", or non-representative, images of visual content is added to previously constructed clusters as an equivalent one. In this case, visual content images remained in the list of "garbage" images remain there until they are entered into one of new clusters constructed of "garbage" images.

The method 200 hence terminates.

Computing Environment

Figure 7:
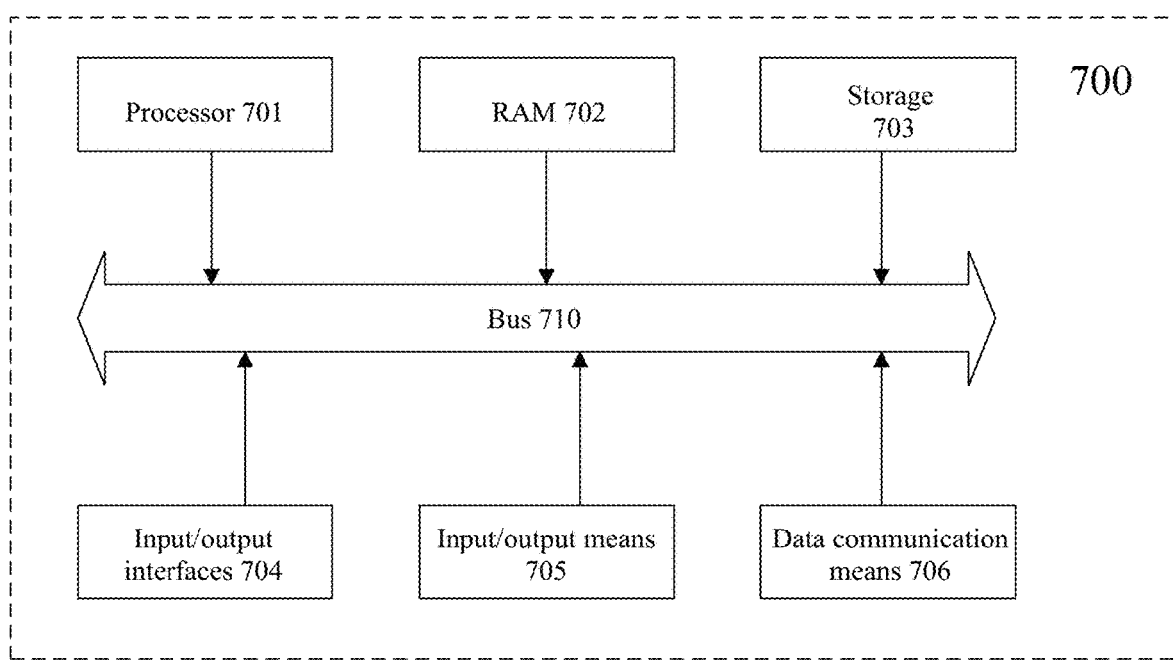
FIG. 7 depicts a schematic diagram of an example computing environment configurable for execution of the present methods of FIG. 3, in accordance with certain non-limiting embodiments of the present technology.

With reference to FIG. 7, there is depicted an example functional diagram of the computing environment 700 configurable to implement certain non-limiting embodiments of the present technology including the method 300.

In some non-limiting embodiments of the present technology, the computing environment 700 may include: the processor 701 comprising one or more central processing units (CPUs), at least one non-transitory computer-readable memory 702 (RAM), a storage 703, input/output interfaces 704, input/output means 705, data communication means 706.

According to some non-limiting embodiments of the present technology, the processor 701 may be configured to execute specific program instructions the computations as required for the computing environment 700 to function properly or to ensure the functioning of one or more of its components. The processor 701 may further be configured to execute specific machine-readable instructions stored in the at least one non-transitory computer-readable memory 702, for example, those causing the computing environment 700 to execute the method 300.

In some non-limiting embodiments of the present technology, the machine-readable instructions representative of software components of disclosed systems may be implemented using any programming language or scripts, such as C, C++, C#, Java, JavaScript, VBScript, Macromedia Cold Fusion, COBOL, Microsoft Active Server Pages, Assembly, Perl, PHP, AWK, Python, Visual Basic, SQL Stored Procedures, PL/SQL, any UNIX shell scripts, or XML. Various algorithms are implemented with any combination of the data structures, objects, processes, procedures, and other software elements.

The at least one non-transitory computer-readable memory 702 may be implemented as RAM and contains the necessary program logic to provide the requisite functionality.

The storage 703 may be implemented as at least one of an HDD drive, an SSD drive, a RAID array, a network storage, a flash memory, an optical drive (such as CD, DVD, MD, Blu-ray), etc. The storage 703 may be configured for long-term storage of various data, e.g., the aforementioned documents with user data sets, databases with the time intervals measured for each user, user IDs, etc.

The input/output interfaces 704 may comprise various interfaces, such as at least one of USB, RS232, RJ45, LPT, COM, HDMI, PS/2, Lightning, FireWire, etc.

The input/output means 705 may include at least one of a keyboard, joystick, (touchscreen) display, projector, touchpad, mouse, trackball, stylus, speakers, microphone, and the like. A communication link between each one of the input/output means 705 can be wired (for example, connecting the keyboard via a PS/2 or USB port on the chassis of the desktop PC) or wireless (for example, via a wireless link, e.g., radio link, to the base station, which is directly connected to the PC, e.g., to a USB port).

The data communication means 706 may be selected based on a particular implementation of the network 120, and may comprise at least one of: an Ethernet card, a WLAN/Wi-Fi adapter, a Bluetooth adapter, a BLE adapter, an NFC adapter, an IrDa, a RFID adapter, a GSM modem, and the like. As such, the connectivity hardware 404 may be configured for wired and wireless data transmission, via one of WAN, PAN, LAN, Intranet, Internet, WLAN, WMAN, or GSM networks.

These and other components of the computing environment 700 may be linked together using a common data bus 710.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method for clustering phishing web resources based on images of visual content thereof, the method being executable by a computer device comprising a processor, the method comprising:
   receiving, by the processor, references to a plurality of phishing web resources;
   generating, by the processor, for a given phishing web resource of the plurality of phishing web resources, at least one image of a visual content of the given phishing web resource;
   analyzing, by the processor, the at least one image associated with the given phishing web resource, the analyzing comprising:
      identifying contours of elements of the visual content of the given phishing web resource within the at least one image;
      identifying, among the contours, identical contours; and
      removing the identical contours from further consideration;
   conducting pairwise comparison between the contours associated with the given phishing web resource and contours of stored clusters of visual content images;
   determining, by the processor, a respective similarity value between the contours associated with the given phishing web resource and contours of each stored cluster of the stored clusters;
   in response to the respective similarity value associated with a given stored cluster exceeding a threshold value, adding the at least one image of the visual content of the given phishing web resource to the given stored cluster;
   in response to the respective similarity value associated with each stored cluster being lower than the threshold value, creating a new cluster for the at least one image of the visual content of the given phishing web resource;
   storing, in a database, data indicative of an association between the given phishing web resource and a respective cluster of the at least one image;
   removing clusters containing less than three images;
   adding the images of the removed clusters into a list of non-representative images; and
   creating an adjacency matrix, a given element of which is representative of a number of matched contours between a given pair of the list of non-representative images.

2. The method of claim 1, wherein the plurality of phishing web resources includes at least two phishing web resources.

3. The method of claim 1, wherein the receiving the references to the plurality of phishing web resources comprises scanning a network to which the computing device is communicatively coupled.

4. The method of claim 1, wherein the receiving the references to the plurality of phishing web resources comprises receiving at least some thereof from an external source via a network to which the computing device is communicatively coupled.

5. The method of claim 1, wherein the receiving the references to the plurality of phishing web resources is from a preliminary-formed web resource database.

6. The method of claim 1, wherein the identifying the contours of the elements of the visual content of the given phishing web resource comprises identifying contours of at least one of: logos, letter outlines, individual words, pictures, and forms.

7. The method of claim 1, wherein the identifying the contours comprises applying at least one of: a Canny edge detector and a contour tracing algorithm.

8. The method of claim 1, further comprising, prior to the conducting the pairwise comparison, removing from further consideration at least one of: small-size, oblique, and elongated contours.

9. The method of claim 1, further comprising, prior to the conducting the pairwise comparison, identifying and removing from further consideration similar contours,
   the similar contours differing in at least one of a height and a width by no more than two pixels.

10. The method of claim 1, further comprising, prior to the conducting the pairwise comparison, for a given pair of contours within the at least one image associated with the given phishing web resource differing in at least one of a height and a width by two pixels or less:
   superimposing the given pair of contours within the at least one image to determine a pixel difference between the given pair of contours;
   determining, for the pixel difference, a respective similarity score (P) as an arithmetic mean of pixel values from each one of three Red, Green, and Blue (RGB) channels, in accordance with an equation:

$$P = \frac{\sum_{i=1}^{N} Ri + \sum_{i=1}^{N} Gi + \sum_{i=1}^{N} Bi}{N},$$

where Ri, Gi, Bi is an i-th respective pixel value in the Red, Green, and Blue channels, respectively, of the pixel difference, and N—a total number of pixels in the pixel difference; and
   if the respective similarity score does not exceed 7, removing the given pair of contours from further consideration.

11. The method of claim 1, wherein in response to the respective similarity value associated with the given stored cluster exceeding the threshold value, prior to the adding the at least one image of the visual content of the given phishing web resource to the given stored cluster, the method further comprises:
   determining a number of similar contours in the contours in the at least one image to respective ones of the stored contours in the given stored cluster;
   in response to the number of the similar contours being less than two:

rejecting the at least one image from adding to the given stored cluster; and generating a warning message about the at least one image being non-representative of the visual content of the given phishing web resource;

in response to the number of the similar contours being more than two but less than five, adding the at least one image to the given stored cluster if each one of the similar contours of the at least one image matches the respective ones of the stored contours of the given stored cluster;

in response to the number of the similar contours being more than five but less than ten, adding the at least one image associated with the given phishing web resource to the given stored cluster if at least a half of the similar contours of the at least one image matches the respective ones of the stored contours of the given stored cluster;

in response to number of the similar contours being more than ten but less than fifteen, adding the at least one image to the given stored cluster if a quarter of the similar contours of the at least one image matches the respective ones of the stored contours of the given stored cluster; and in response to number of similar contours being more than fifteen, adding the at least one image to the given stored cluster if a one-fifth of the similar contours of the at least one image matches the respective ones stored contours of the given stored cluster.

12. The method of claim 1, wherein in response to the respective similarity value associated with the given stored cluster exceeding the threshold value, prior to the adding the at least one image of the visual content of the given phishing web resource to the given stored cluster, the method further comprises:

in response to the given stored cluster containing less than two contours, removing the given stored cluster from the stored clusters.

13. The method of claim 1, wherein the adding the at least one image of the visual content of the given phishing web resource to the given stored cluster is executed if the given stored cluster has a largest number of matches with the at least one image in contours among the stored clusters.

14. The method of claim 1, further comprising:

if the number of matched contours is less than a predetermined threshold, replacing a value of the given element of the adjacency matrix with 0, else 1.

15. The method of claim 14, further comprising:

determining, based on the adjacency matrix, strongly connected graph components, each of which has more than two images, and determining, based on a given strongly connected graph component, a new cluster.

16. A computing device for clustering phishing content, the computing device comprising a processor and a non-transitory computer-readable memory storing instructions, and the processor, upon executing the instructions, being configured to:

receive references to a plurality of phishing web resources;

generate, for a given phishing web resource of the plurality of phishing web resources, at least one image of a visual content of the given phishing web resource;

analyze the at least one image associated with the given phishing web resource, by:

identifying contours of elements of the visual content of the given phishing web resource within the at least one image;

identifying, among the contours, identical contours; and removing the identical contours from further consideration;

conduct pairwise comparison between the contours associated with the given phishing web resource and contours of stored clusters of visual content images;

determine a respective similarity value between the contours associated with the given phishing web resource and contours of each stored cluster of the stored clusters;

in response to the respective similarity value associated with a given stored cluster exceeding a threshold value, add the at least one image of the visual content of the given phishing web resource to the given stored cluster;

in response to the respective similarity value associated with each stored cluster being lower than the threshold value, create a new cluster for the at least one image of the visual content of the given phishing web resource;

store, in a database, data indicative of an association between the given phishing web resource and a respective cluster of the at least one image;

remove clusters containing less than three images;

add the images of the removed clusters into a list of non-representative images; and create an adjacency matrix, a given element of which is representative of a number of matched contours between a given pair of the list of non-representative images.

* * * * *